Figure 1:
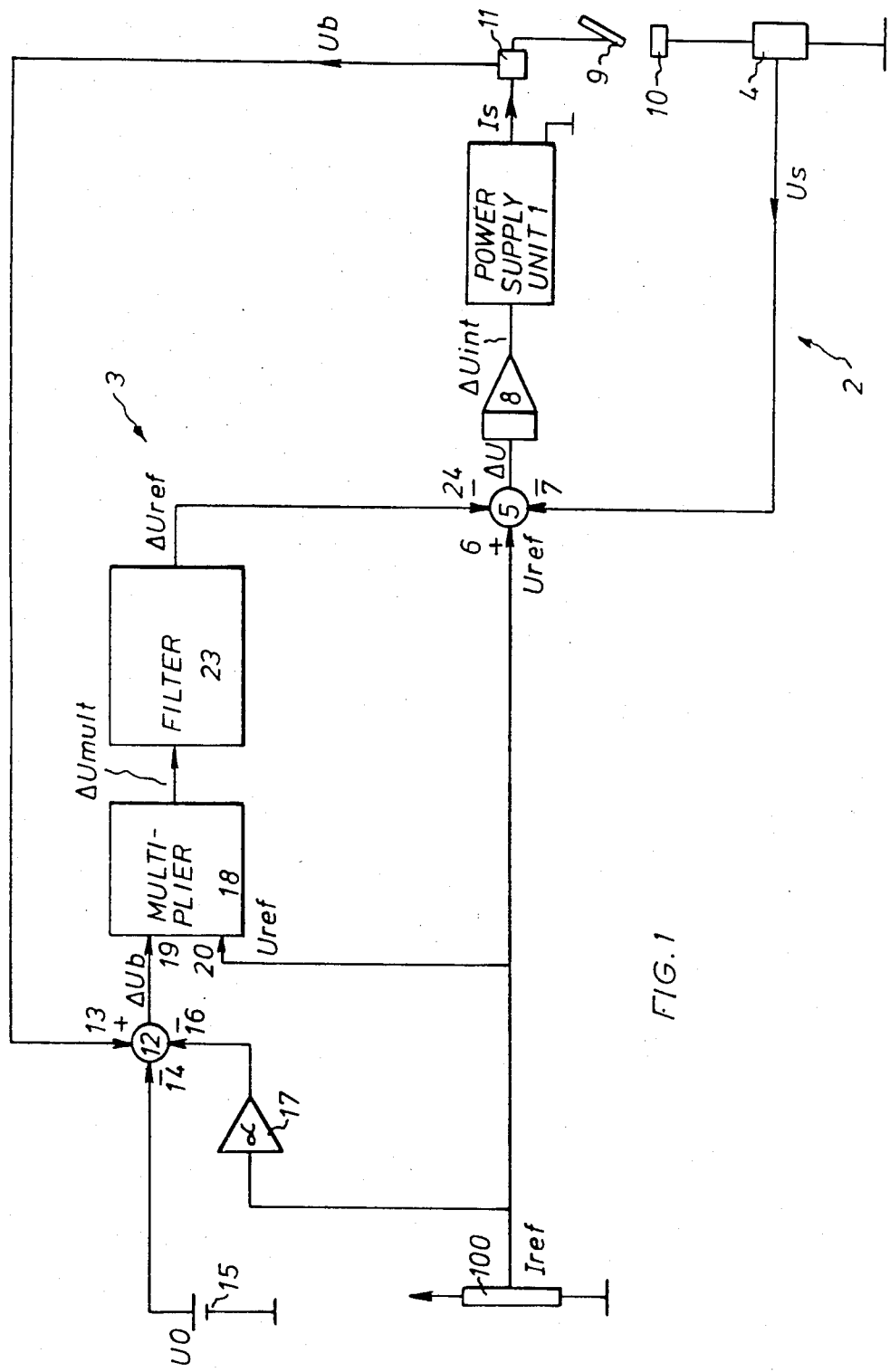

United States Patent [19]
Budai et al.

[11] Patent Number: 4,721,843
[45] Date of Patent: Jan. 26, 1988

[54] METHOD AND APPARATUS FOR CONTROLLING AN ARC WELDING ENERGY SOURCE DURING AN ARC WELDING OPERATION

[75] Inventors: Peter Budai; Ulf Lagerqvist, both of Laxå, Sweden

[73] Assignee: Esab AB, Sweden

[21] Appl. No.: 11,808

[22] Filed: Feb. 6, 1987

[30] Foreign Application Priority Data

Feb. 17, 1986 [SE] Sweden .................................. 8600680

[51] Int. Cl.[4] .............................................. B23K 9/09
[52] U.S. Cl. ............................ 219/130.33; 219/137 PS
[58] Field of Search ..................... 219/130.31, 130.32, 219/130.33, 130.21, 137 PS

[56] References Cited

U.S. PATENT DOCUMENTS

| | | | |
|---|---|---|---|
| 4,300,036 | 11/1981 | Johansson | 219/130.33 |
| 4,349,720 | 9/1982 | Mäkimaa | 219/130.33 |

Primary Examiner—Clifford C. Shaw
Attorney, Agent, or Firm—Beveridge, DeGrandi & Weilacher

[57] ABSTRACT

A method of controlling a welding operation during arc welding between a fusible electrode and a workpiece, wherein the welding operation alternates between arc periods and short-circuiting periods, includes the steps of sensing a first parameter of the welding operation, for example the arc voltage between the electrode and the workpiece, generating a first signal representative of the first parameter, sensing a second parameter of the welding operation, generating a second signal representative of the second parameter, filtering the second signal to provide a filtered signal, generating a desired value signal based upon the filtered signal and controlling the welding operation based upon the difference between the desired value signal and the first signal. According to the method of the present invention, any changes in the second signal that occur at a frequency outside a predetermined frequency range, which includes a desired short-circuiting frequency of the welding operation, are attenuated such that the desired value signal is less affected by these changes than by changes occurring at a frequency within the predetermined frequency range. An apparatus for carrying out the method includes a band-pass filter having a pass band including the desired short-circuiting frequency.

10 Claims, 3 Drawing Figures

METHOD AND APPARATUS FOR CONTROLLING AN ARC WELDING ENERGY SOURCE DURING AN ARC WELDING OPERATION

The present invention relates to a method of controlling the welding operation during arc welding between a fusible electrode and a workpiece. The welding operation alternates between arc periods during which electrode material is fused and short-circuiting periods during which fused electrode material is transferred from the electrode to the workpiece. The method includes the steps of sensing a first parameter dependent on the welding operation and generating a first signal corresponding to the first parameter. A desired value signal which is a function of a second signal corresponding to a second parameter dependent on the welding operation is also generated. The welding operation is controlled in response to the difference between the desired value signal and the first signal.

The invention also relates to an apparatus for controlling a controllable source of energy included in an arc welding set intended for a welding operation alternating between arc periods during which electrode material is fused and short-circuiting periods during which fused electrode material is transferred from the electrode to the workpiece. The apparatus includes a first signal transducer for sensing a first parameter dependent on the welding operation and generating a first electric signal corresponding to the first parameter, a second signal transducer for sensing a second parameter dependent on the welding operation and generating a second electric signal dependent on the second parameter, a first circuit connected to the output of the second transducer for generating a third signal dependent on the second signal, a second circuit adapted to receive the third signal and to form a desired value signal from the third signal and a reference signal to generate an error signal which represents the difference between the desired value signal and the first signal and to supply the error signal at its output to control the source of energy in response to the error signal.

In present-day arc welding, especially handwelding, unstable droplet formation during arc periods may cause difficulties. Sometimes, the droplets formed are too large and interfere with the rhythm of droplet formation, and this results in splashes and spattering which, in turn, reduces the production efficiency. The reason for these difficulties is that up to now, it was not known how to control the welding current according to the welding technique in order to achieve satisfactory results.

In prior art methods of controlling a welding current source, a desired current value is set which corresponds to a desired operating point, the welding current and the arc voltage are sensed, the desired current value is changed in response to the sensed arc voltage, and the current source is controlled by means of a difference signal which represents the difference between the desired current value and the sensed welding current.

This manner of control does not permit use of the welding current to compensate for droplet growth which is too rapid or too slow. As mentioned above, this results in unstable droplet formation.

It therefore is the object of the present invention to provide a novel method for controlling the welding operation, whereby a more stable welding operation having a shorter period time, i.e. the time of an arc period and a short-circuiting period, and thus a higher production efficiency, is achieved.

A further object of the invention is to provide an apparatus for carrying out the method.

To this end, the present invention proposes a method which comprises the steps mentioned by way of introduction and which is characterised in that the second signal is filtered and then used to generate the desired value signal. Any changes in the second parameter dependent on the welding operation, which changes occur at a frequency outside a predetermined frequency range including a desired short-circuiting frequency in the welding operation, are attenuated such that the desired value signal is less affected by these changes than by changes occurring at a frequency within the predetermined frequency range.

An apparatus of the type mentioned above and designed for carrying out the method according to the invention is characterised in that a band-pass filter, the pass band of which includes a desired short-circuiting frequency corresponding to the welding operation, is connected between the output of the second transducer and the input of the second circuit.

The above-mentioned first parameter preferably is the welding current and the arc voltage, respectively, while the second parameter is the arc voltage and the welding current, respectively. However, combinations of these parameters may also be used, such as the welding energy. It is also possible to proceed from other parameters characteristic of the welding operation. In the following it is assumed that the first parameter is the welding current, while the second parameter is the arc voltage.

By "arc voltage" what is meant is measured voltage including the actual arc voltage between the electrode tip and the workpiece. Usually, the measured arc voltage also includes the voltage drop at the free electrode end between the welding torch tip and the electrode tip.

The present invention is based upon observations of periodicity in the welding operation. For handwelding, this periodicity is within a frequency range of from 1 to 80 Hz, preferably from 3 to 50 Hz, and for semi-automatic and fully automatic welding the periodicity within a frequency range of from 50 to 250 Hz, preferably from 50 to 150 Hz. By intensifying this periodicity which manifests itself in changes in the arc voltage at frequencies within a narrower frequency band within the frequency range, and by attenuating the arc voltage changes outside the frequency range, which changes are caused by undesirably rapid or slow droplet growth, more stable operation can be achieved.

Moreover, the present invention operates according to the set static desired current value, i.e. to the operating point. The higher the set current value, the greater the change of the desired current value for a specific change of the arc voltage which occurs at a frequency within the pass band of the filter.

In summation, the apparatus according to the present invention provides for stable operation and higher production efficiency.

Figure 2:
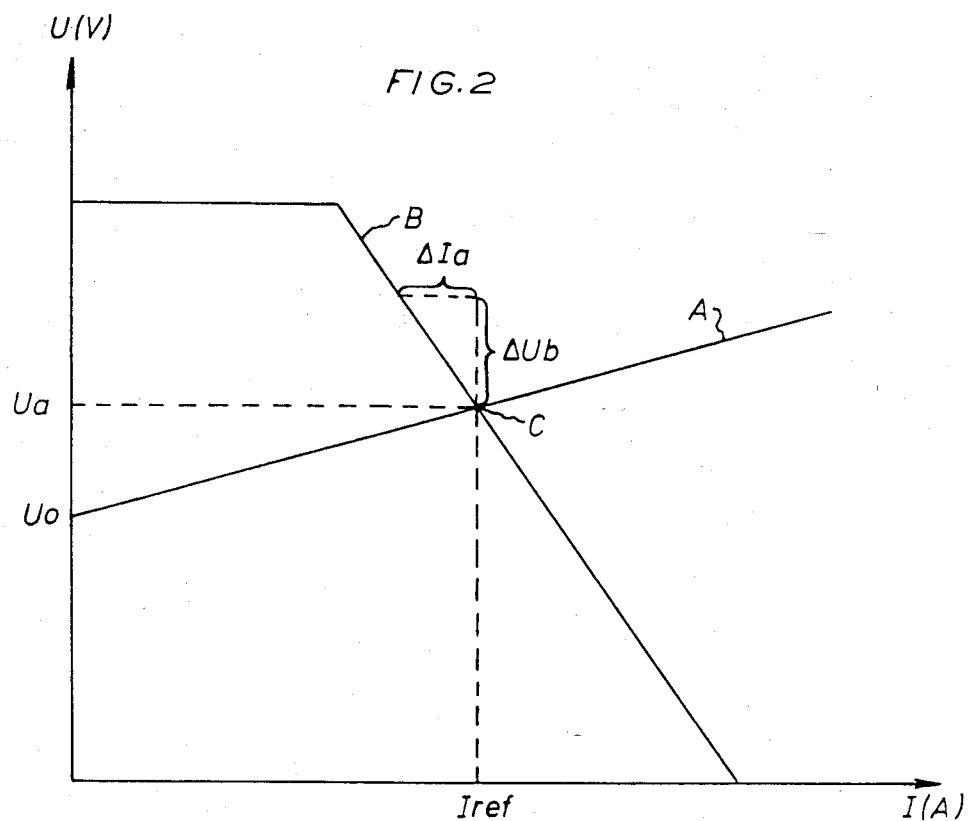
Figure 3:
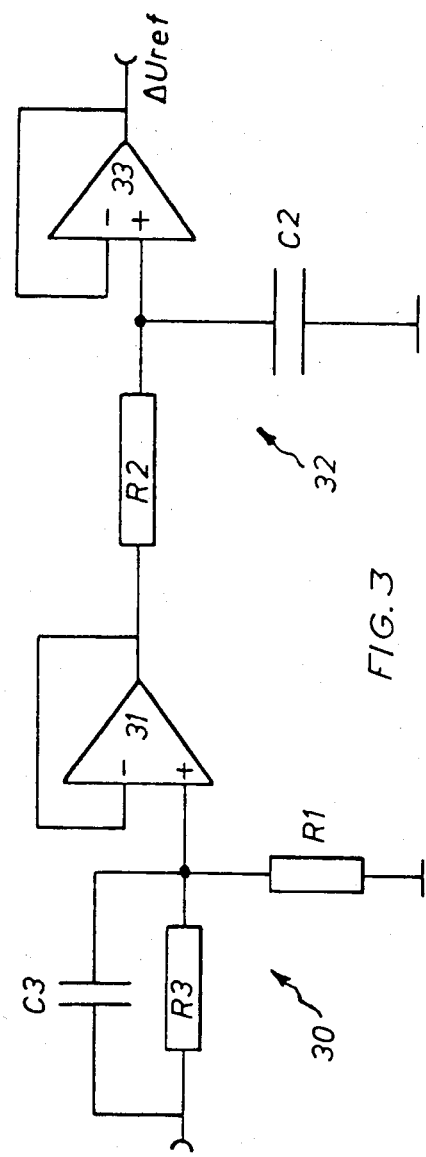

The invention will be described below with reference to the accompanying drawings in which like parts bear like reference numerals. In the drawings FIG. 1 is a block diagram of an apparatus according to the invention;

FIG. 2 is a voltage-current diagram showing a static operating line for an apparatus according to the invention; and FIG. 3 is a circuit diagram illustrating a possible implementation of the filter in the apparatus according to FIG. 1.

FIG. 1 illustrates a current-controlled welding current source 1 for a welding set, an associated control means which comprises a per se known current control system generally designated 2, and a desired value setting unit generally designated 3.

The current control system 2 comprises a measuring means 4 adapted to sense the welding current Is generated by the welding source 1 and to generate a voltage Us proportional thereto, a subtractor 5 which at its positive input 6 receives a reference voltage Uref representing the desired current value, and which at its first negative input 7 receives the voltage Us generated by measuring means 4. The output of the subtractor 5 is provided to a proportional integrating device 8 which eliminates control error. The output of the device 8 is provided to the current source 1.

The current source 1 thus generates the welding current Is which flows via the welding electrode 9 and the workpiece 10 to earth and back to the current source. The measuring means 4 senses the current Is and generates the voltage Us which is subtracted from the reference voltage Uref in the subtactor 5. The difference signal $\Delta U$ thus generated is integrated in the proportional integrating device 8, and the current source 1 is controlled by means of the integrating device output signal $\Delta Uint$. In other words, the current control system 2 regulates, in a well-known manner, the welding current so that it follows as accurately as possible the reference value Uref which corresponds to a specific set reference current Iref. The reference value Uref is set by means of a potentiometer 100.

The desired value setting unit 3 comprises a measuring means 11 which is adapted to sense the arc voltage between the electrode 9 and the workpiece 10 and to generate a signal Ub proportional to the arc voltage, and a subtractor 12 whose positive input 13 is connected to the output of the measuring means 11. The first negative input 14 of the subtractor 12 is connected to a voltage source 15 which provides a constant voltage U0, and the second negative input 16 is connected to the potentiometer 100 via an amplifier 17 having an amplification constant $\alpha$ which is discussed further with respect to the equation below. Furthermore, a multiplier 18 is included, one input 19 of which is connected to the output of the subtractor 12, while the other input 20 of the multiplier is connected to the potentiometer 100. A band-pass filter 23 is provided with an input connected to the output of the multiplier and with an output connected to the second negative input 24 of the subtractor 5.

The desired value setting unit 3 sets the desired value in response to the arc voltage, and its function is as follows: the arc voltage is sensed by the measuring means 11, and a signal Ub representing the arc voltage is generated. The deviation of the arc voltage from the voltage corresponding to an operating point set on the load line of the arc, given by the equation $Ua = \alpha \times Iref + U0$, wherein $\alpha$ is a constant, Iref is the desired current value, and U0 is a constant voltage, is determined by the subtractor 12, and the difference signal $\Delta Ub$ generated by the subtractor is supplied to the first input 19 of the multiplier 18. The signal $\Delta Ub$ is multiplied in the multiplier by the reference voltage Uref and a constant set for the multiplier. By this multiplication, the operating point on the arc load line is taken into account. The higher the static desired current value, the greater the change of the desired value for a given change of the arc voltage which occurs at a frequency within the pass band of the filter.

The voltage-current diagram of FIG. 2 aids in understanding the significance of the above-mentioned steps. The diagram shows the load line A of the arc given by the equation $U = \alpha \times I + U0$ and the operating point C on the static operating line B given by the equation $U = \alpha \times Iref + U0$, as above. The inclination of the static operating line is given by $K = dU/dI$, and the inclination is different for different operating points on the arc load line. If the desired current value Iref is increased, the absolute value of dU/dI decreases, i.e. the operating line B will be flatter. By selecting a suitable value for the multiplier constant the effect of Iref on the inclination of the operating line and the extent of flattening in connection with an increase of Iref is either increased or reduced. The deviation of the measured arc voltage from the voltage Ua corresponding to the operating point at a given time during the welding operation is given by $\Delta Ub$. A change $\Delta Ia$ of the set current reference Iref corresponds to the voltage difference $\Delta Ub$. A voltage value $\Delta Umult$ corresponding to the difference $\Delta Ia$ is obtained by means of the multiplier 18. As will appear from FIG. 1, the output signal is supplied from the multiplier 18 to the band-pass filter 23 and is filtered, whereupon the filtered signal $\Delta Uref$ is subtracted from the reference signal Uref to form the desired value signal.

The filter 23 attenuates any changes in the arc voltage that occur at frequencies lower or higher than frequencies within a given frequency range, including the desired short-circuiting frequency, more than any changes in the arc voltage occurring at a frequency within this range. As a result, the desired short-circuiting frequency is stabilized, and a better welding result is obtained.

FIG. 3 illustrates a possible implementation of the filter 23. This implementation includes a first proportional derivating part or differentiator 30, a first follower 31 for impedance adaptation, a low-pass filter 32, and a second follower 33. The proportional differentiator 30 comprises a resistor R1 in series with the parallel combination of a resistor R3 and a capacitor C3. The connection point between the parallel arrangement of the resistor R3/capacitor C3 and the resistor R1 is connected to the positive input of the first follower 31 the output of which is connected to the low-pass filter 32. The low-pass filter 32 comprises a resistor R2, which is connected between the output of the first follower 31 and the positive input of the second follower 33, and a capacitor C2 connected between the positive input of second follower and earth. Naturally, the filter and the remaining components can be implemented in many different ways.

For an arc load line with U0=20 V and $\alpha$=0.04, the following component values proved suitable: R3=27 k$\Omega$, R1=18k$\Omega$, R2=15k$\Omega$, C3=2.2 $\mu$F and C2=0.47 $\mu$F.

The invention can be modified in many different ways within the scope of the appended claims. For example, the function of the desired value setting unit 3 may be provided by a programmed microcomputer.

What we claim and desire to secure by Letters Patent is:

1. A method of controlling arc welding between a fusible electrode and a workpiece wherein the welding operation alternates between arc periods during which electrode material is fused and short-circuiting periods during which fused electrode material is transferred from the electrode to the workpiece, said method comprising the steps of:

sensing a first parameter of the welding operation, generating a first signal representative of the first parameter, sensing a second parameter of the welding operation, generating a second signal representative of the second parameter, filtering the second signal to attenuate frequencies outside a predetermined frequency range, including a desired short-circuit frequency, and to thereby provide a filtered signal;

generating a desired value signal based upon the filtered signal, and controlling the welding operation based upon a difference between the desired value signal and the first signal whereby the desired value signal is less affected by changes to the second parameter at frequencies outside the predetermined frequency range than by changes occurring at a frequency within the predetermined frequency range.

2. A method as claimed in claim 1, further comprising the steps of providing a reference signal and selecting an operating point for the welding operation, the desired value signal being formed by subtacting the filtered signal from the reference signal.

3. A method as claimed in 1, further comprising the steps of selecting an operating point for the welding operation, providing a signal representative of the operating point and subtracting the signal representative of the operating point from the second signal before filtering the second signal.

4. A method as claimed in claim 3, further comprising the step of multiplying the second signal after subtraction of the signal representative of the operating point therefrom by the reference signal before filtering the second signal.

5. An apparatus for controlling a source of energy throughout an arc welding operation having alternating periods during which electrode material is fused and during which fused electrode material is transferred from the electrode to a workpiece, said apparatus comprising:

a first signal transducer for sensing a first parameter of the welding operation and generating a first electric signal representative of the first parameter, a second signal transducer for sensing a second parameter of the welding operation and generating a second electric signal representative of the second parameter, a first circuit connected to the output of said second transducer for generating a third signal dependent on the second signal, said first circuit including a band-pass filter having a pass band including a predetermined short-circuiting frequency for receiving and filtering the third signal to provide a filtered signal as the third signal, a second circuit connected to said second transducer by said first circuit and having a first input connected to receive the filtered signal, a second input connected to receive a reference signal and an output adapted to be connected to the energy source, said second circuit forming a desired value signal from the filtered signal and the reference signal, generating an error signal representing a difference between the desired value signal and the first signal, and supplying the error signal from said second circuit output for controlling the source of energy in response to the error signal.

6. An apparatus as claimed in claim 5, wherein said band-pass filter is connected between an output of said first circuit and the first input of said second circuit.

7. An apparatus as claimed in claim 6, wherein said filter comprises a differentiating circuit and a low-pass filter.

8. An apparatus as claimed in claim 6 wherein said second circuit includes a subtractor having a positive input for receiving the reference signal and a negative input for receiving the filtered signal.

9. An apparatus as claimed in claim 6, wherein said first circuit includes a subtractor having means for receiving a signal representative of a given operating point for the welding operation, said subtractor forming said third signal based upon the difference between said second signal and the signal representative of the given operating point.

10. An apparatus as claimed in claim 9, wherein said first circuit includes a multiplier having a first input which is connected to the output of the subtractor, a second input which receives the reference signal, and an output which is connected to the filter.

* * * * *